Nov. 29, 1966 P. SAKWA 3,288,251
SKATEBOARD BRAKE
Filed May 18, 1965 3 Sheets-Sheet 1

INVENTOR
*Paul Sakwa*

BY *McLean, Morton & Boustead*
ATTORNEYS

Nov. 29, 1966 — P. SAKWA — 3,288,251
SKATEBOARD BRAKE
Filed May 18, 1965 — 3 Sheets-Sheet 2

INVENTOR
Paul Sakwa
BY McLean, Morton & Boustead
ATTORNEYS

Nov. 29, 1966          P. SAKWA          3,288,251
SKATEBOARD BRAKE
Filed May 18, 1965          3 Sheets-Sheet 3
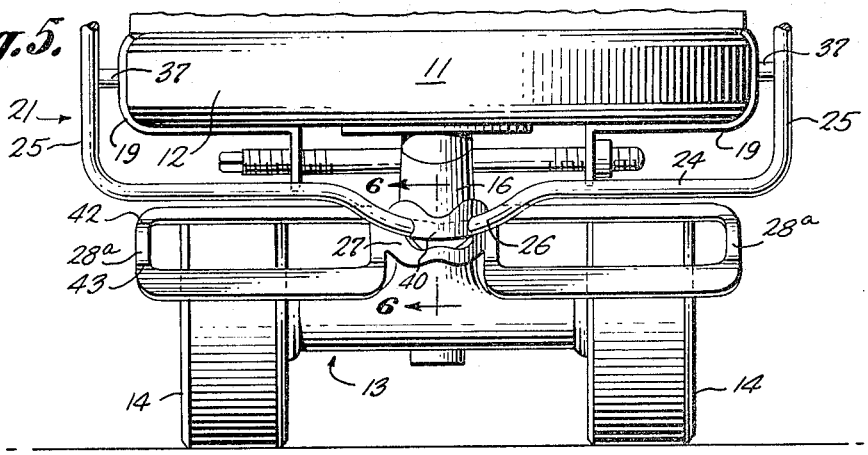
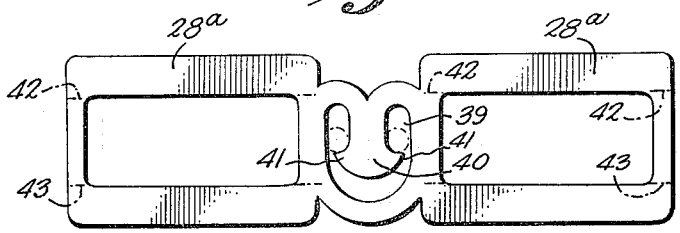
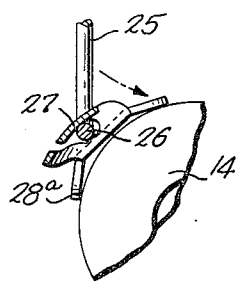
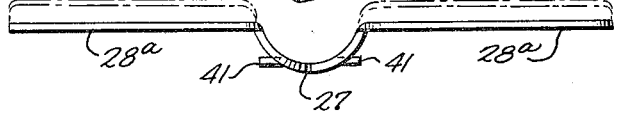
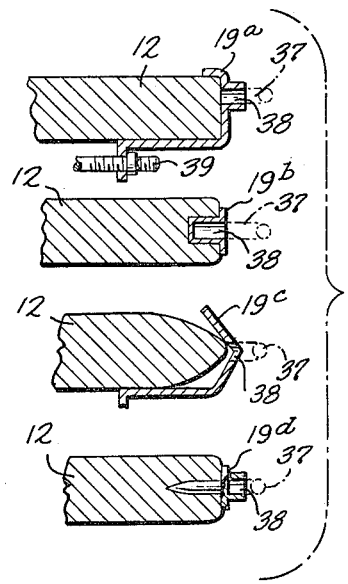
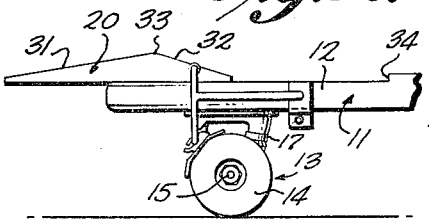
INVENTOR
*Paul Sakwa*
BY *McLean, Morton & Boustead*
ATTORNEYS

United States Patent Office

3,288,251
Patented Nov. 29, 1966

3,288,251
SKATEBOARD BRAKE
Paul Sakwa, 825 New Hampshire Ave. NW.,
Washington, D.C.
Filed May 18, 1965, Ser. No. 456,649
1 Claim. (Cl. 188—29)

This invention relates to braking devices for skateboards, scooters and other vehicles which use pivotally mounted roller skate wheel truck assemblies.

The skateboard, or as it is often called, sidewalk surfboard, to which this invention primarily relates has become extremely popular during the last few years with children of all ages. The skateboard allows the child to obtain great speeds, often in excess of 20 miles per hour, but allows for only limited directional control. To date, no effective braking device has been devised.

As is frequently reported in the newspapers, serious injuries often result when excessive speeds are obtained or when the child is unavoidably propelled into automobile traffic. Several states have already enacted legislation prohibiting these skateboards on public thoroughfares.

My device allows the child to control excessive speeds or to bring the skateboard to a stop before it crosses an automobile's path.

My device is easily activated by the child while not interfering with the normal balancing and steering of the skateboard.

My device supplies equal pressure to both rear wheels whether the skateboard is moving straight ahead or is in a turn.

My device is self-compensating whereby an abrupt braking action tends to move the body forward and thereby lift the heel of the child thereby reducing the braking force and lessening the possibility of locking the wheels or throwing the child off the skateboard.

Lastly, my device is designed to be rapidly pivoted into an inoperative position where it does not interfere with the present uncontrolled operation of the skateboard.

The invention will be further described with reference to the accompanying drawing in which:

FIG. 5 is the same view as FIG. 4, but showing an alternate form of brake pad;

FIG. 6 is a side view of the brake pad, swivel housing and swivel bar;

FIG. 7 is a detailed view of the alternate form of brake pad and swivel housing;

FIG. 8 is an elevation view of the brake pad shown in FIG. 7;

FIG. 9 shows four variations of the clamping device for attaching the skateboard brake to the board of the skateboard;

FIG. 10 shows the brake pedal of the skateboard brake rotated rearwardly into the inoperative position.

In the following descriptions, like reference numerals refer to the same element in the various figures.

Figure 1:
FIG. 1 depicts a child on a skateboard equipped with the braking device of the present invention.

The skateboard 11, to which my invention pertains, is comprised of a flat or slightly arcuate board 12, of about two feet in length and about six inches in width. Front and rear wheel truck assemblies 13, are attached to the board. These wheel assemblies may be pivoted from side to side by the child varying his pressure from one side of the skateboard to the other, this in turn allows the skateboard to be maneuvered and somewhat controlled by the child.

The wheel assembly 13 is comprised of two wheels 14, mounted on a common axle 15. To this axle are attached a pivot arm 16 and a supporting arm 17. The supporting arm 17 contains a rubber compression ring 18 which resists twisting and tends to force the wheels into a normally straight position. Pivot arm 16 forms the axis about which the wheel assembly can be twisted on the board.

The illustrated wheel assembly is not part of my invention but is one of the better quality wheel assemblies currently on the market. My invention may also be used with other wheel assemblies of different construction such as those having a vertical supporting arm and no pivot arm and those which may or may not pivot.

My braking device comprises a skate clamp 19, a brake pedal 20, a brake frame 21, which itself, is comprised of two attaching arms 22 and upper bar 23, a lower bar 24, two side bars 25 and a swivel bar 26. Other elements of my braking device are the swivel housing 27, and the two-element brake pad 28.

Figure 2:
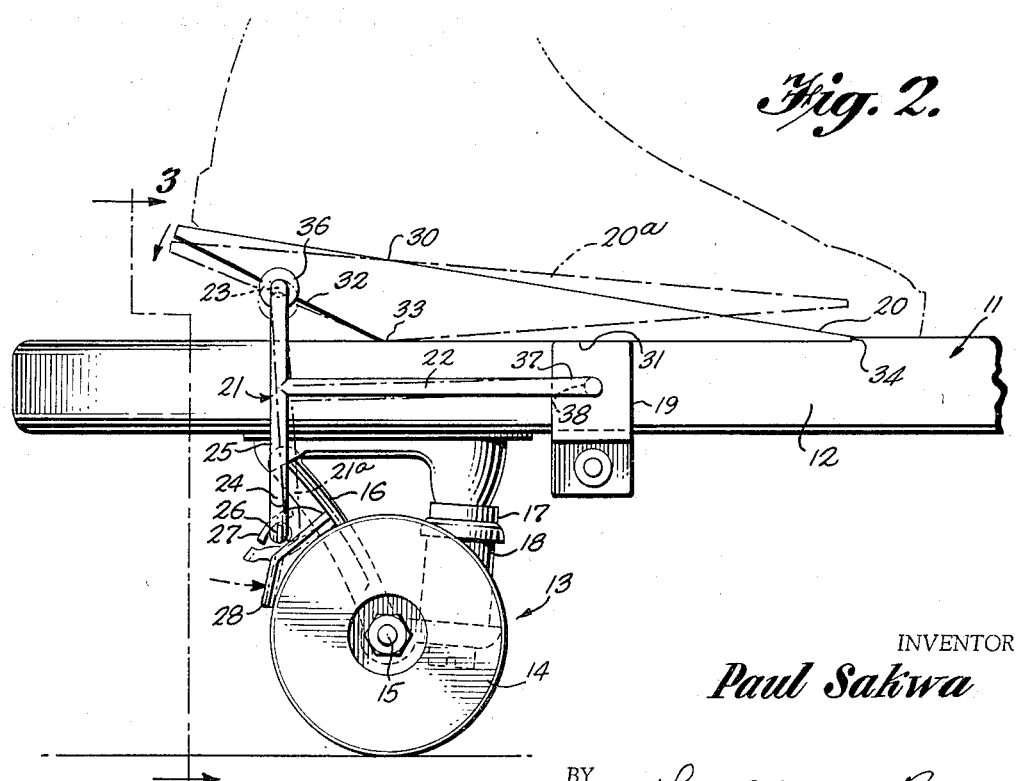
FIG. 2 is a side elevation of the rear portion of the skateboard.

As shown in FIGURE 2, the brake pedal 20, is in cross-section a triangular board with a top surface 30, on which the foot of the child may rest, a forward lower surface 31, which the board rests on when the child has his weight on the ball of his foot. There is also a lower rear surface 32, which intersects the lower front surface 31 at the pivot point 33. When the child rocks his weight backwardly onto his heel, the brake pedal pivots around point 33 and assumes the position shown by the dotted lines 20a.

My skateboard brake may be either built and sold with the skateboard or may be attached to existing skateboards. When it is installed with a new skateboard, it may be preferable to indent the top surface of the board 12, at point 34 to allow the tip of the brake pedal 20, to fit flush with the surface of board 12 when the pedal is in the forward position.

The brake frame 21, is attached to the lower rear surface 32, of brake pedal 20. It may be attached by any convenient means 35 which allows free rotation during the braking operation. The brake frame 21, must also be restrained from sliding laterally with respect to the brake pedal. Flanges or other restraining devices 36 on the brake frame 21 bear against the brake pedal 20, to accomplish this.

The brake frame 21 must also be attached to the rear surface of brake pedal 20 with sufficient flexibility so that the brake pedal may be reversed to the inoperative position, as shown in FIG. 10. This also requires the clearance between the lower surface of upper bar 23 and the board 12 to be greater than that portion of brake pedal 20 extending rearwardly of the attachment points 35.

Connected to the upper bar 23, of the brake frame are two side bars 25. These are connected both to the lower bar 24 and the attaching arms 22. The free end 37, of the attaching arm is inserted into the socket 38 of the skate clamp 19.

FIG. 9 shows four variations of this skate clamp. These variations are necessitated by the wide differences in existing skateboard dimensions and constructions. 19a is a clamp which may be attached using a conventional roller skate key and requires no nailing. A threaded bolt 39 holds the two portions of the clamp on opposite sides of the skate. 19b is essentially a bushing which may be inserted into a hole previously drilled into the side of the skateboard. 19c is a variation of 19a to allow attachment to boards with beveled edges. 19d is a bushing similar to that shown in 19b but attached to the head of a nail which may be easily driven into the side of a board. A simple hole in the board also works well.

Figure 4:
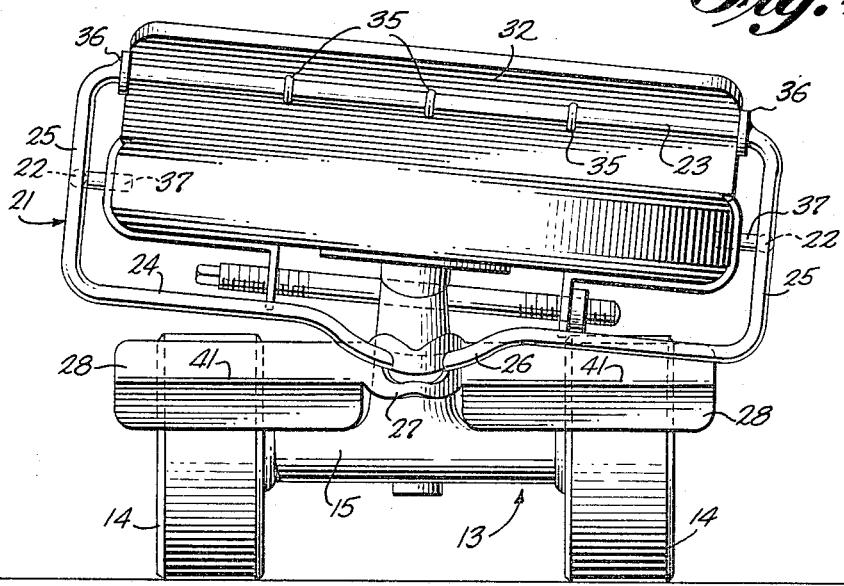
FIG. 4 is the same view as FIG. 3, but showing the skateboard and wheel assembly pivoted for turning of the skateboard.

The side bars 25 also are connected to the lower bar 24, which contains in its center the arcuate swivel bar 26. This swivel bar is attached to the swivel housing 27. The downwardly projecting arc of the swivel bar 26 allows the swivel housing and brake pad to pivot with the wheel housing as shown in FIG. 4 while it prevents substantial lateral movement of the swivel housing and brake pad. As shown in FIG. 6, lateral movement is prevented by the close proximity of the brake pad to the wheels.

The swivel housing, as shown in FIG. 8, is itself semi-circular in cross-section. This allows the swivel bar to be passed through the lower part of the U-shaped opening 39 and held by the inverted T-shaped central bar 40. The semi-circular shape and the illustrated cleft also allows the swivel bar to be placed closer to the pivot arm 16, of the wheel assembly.

As shown in FIG. 8, the two flanges 41 of the central bar 40 are not bent into the semi-circular shape of the swivel housing until the swivel housing and brake pad have been fitted onto the swivel bar 26. If necessary, they may then easily be turned down with pliers or hammer to more securely fasten the two elements together.

The above feature is important, since after continuous use, the brake pad, like the wheels themselves, will wear out and need replacement.

Figure 3:
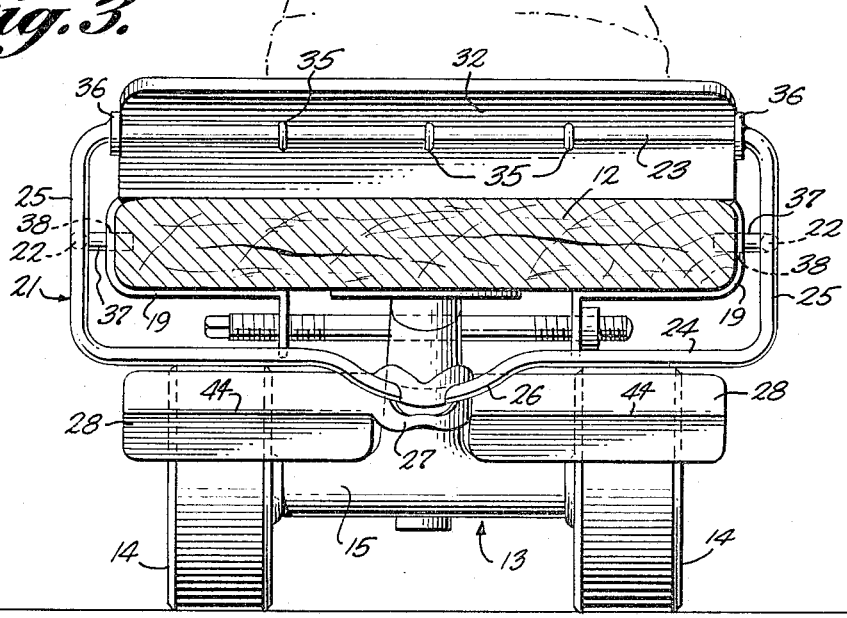
FIG. 3 is view of the rear of the skateboard looking forwardly.

The drawings show two forms of brake pads which have been tested on my skateboard brake. In FIGS. 2, 3 and 4 are shown brake pad 28 as a singular rectangular piece of metal for each wheel. The brake pad is bent along axis 41 so that the top and bottom portions of the brake pad are forced against the wheel when the brake frame is depressed as shown in 21a when the child rocks back on the brake pedal as shown in 20a.

An alternate form of brake pedal is shown at 28a in FIGS. 5, 6 and 7. The central portion of the two rectangular brake pads are optionally cut out and the brake pad itself is slightly bent along two axes 42 and 43.

The purpose of having the brake pad contact the wheel in at least two points is best shown in FIGS. 2 and 6. When the brake pedal 20 is in its normal position and the brake frame 21 elevated, the brake pad may be lightly contacting but is not slowing the wheels of the skateboard. Its close proximity to the wheels however, prevents it from being twisted into an inoperative position, and when the wheel assembly is itself twisted, as shown in FIG. 4, the wheels force the brake to pivot with them.

Having described my invention, I claim:

A braking device for skateboards having pivotally mounted front and rear wheel assemblies comprising:
(a) a brake pad for compressing against the periphery of both rear wheels of the skateboard;
(b) said brake pad having forwardly projecting top and bottom portions whereby said top and bottom portions engage said periphery to prevent slippage of said brake pad;
(c) a brake frame attached to said brake pad through a swivel bar and swivel housing allowing said brake pad to freely rotate through an arc corresponding to the arc of said pivotally mounted rear wheel assembly;
(d) a brake pedal attached to said brake frame;
(e) said brake pedal having a single inclined upper surface for placement of the operators foot and two lower surfaces joining in a pivot point;
(f) said brake pedal in normal position resting on the forward lower surface holding said brake frame attached to the rear of the pedal in an elevated position which in turn holds said brake pad slightly apart from the rear wheels, whereby said wheel assembly, when pivoting, will lightly contact said top and bottom portions of said brake pad and forcing it into an arc corresponding to the arc of said pivoted wheel assembly;
(g) said brake pedal being pivoted by rocking back on its pivot point, lowering said brake frame and pressing said brake pad firmly against the rear wheels of the skateboard.

References Cited by the Examiner
UNITED STATES PATENTS

| | | | |
|---|---|---|---|
| 430,006 | 6/1890 | Dorr | 280—11.2 |
| 2,173,716 | 9/1939 | Gurleay | 280—11.2 |

MILTON BUCHLER, *Primary Examiner.*

B. S. MOWRY, *Assistant Examiner,*